Figure 1:
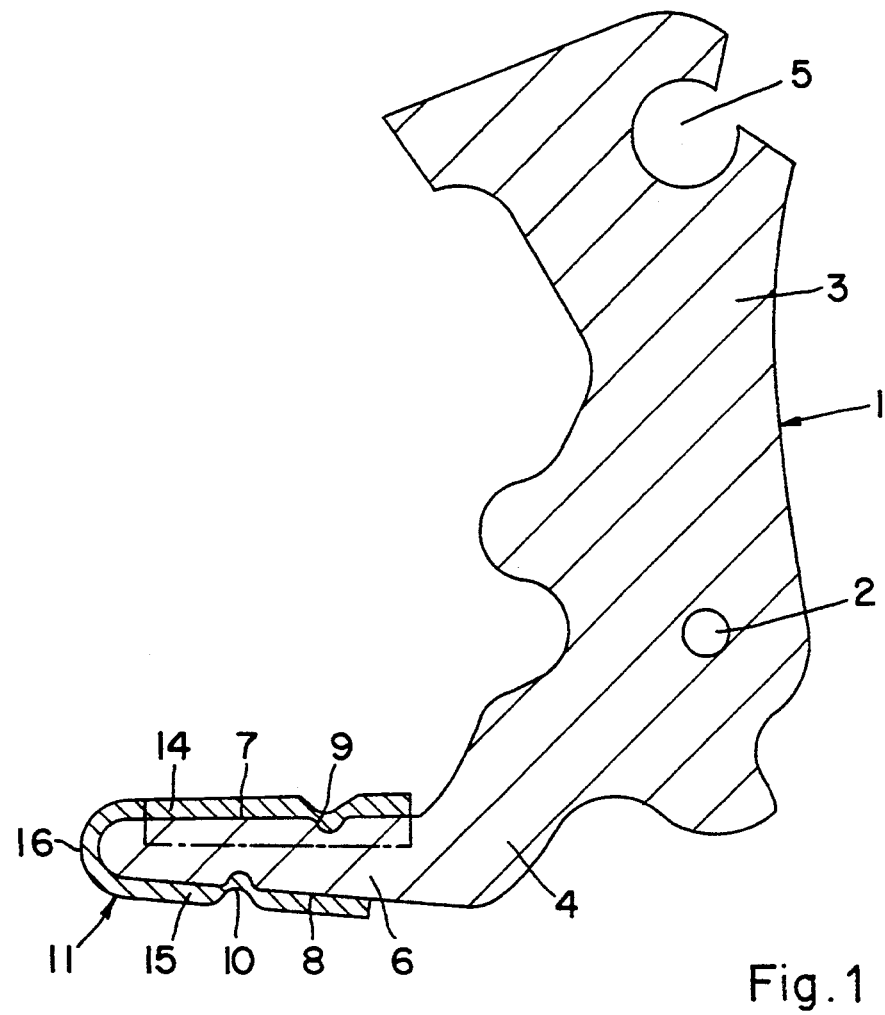

United States Patent
Schoeller

[11] Patent Number: 5,373,756
[45] Date of Patent: Dec. 20, 1994

[54] DETENT LEVER FOR A STACKING COLUMN FOR STORING STORAGE PRODUCTS

[75] Inventor: Heinz Schoeller, Rielasingen/Worblingen, Germany

[73] Assignee: Croon & Lucke Maschinenfabrik GmbH, Mengen, Germany

[21] Appl. No.: 967,210

[22] Filed: Oct. 27, 1992

[30] Foreign Application Priority Data

Nov. 11, 1991 [DE] Germany .............. 4137119

[51] Int. Cl.⁵ ............................................ G05G 5/06
[52] U.S. Cl. ................................ 74/527; 414/795.3; 428/908.8
[58] Field of Search ............... 74/519, 527, 558.5, 74/557, 529, 531; 414/798.1, 795.2; 428/908.8

[56] References Cited

U.S. PATENT DOCUMENTS

| | | | |
|---|---|---|---|
| 3,160,292 | 12/1964 | Albrecht | 414/795.3 X |
| 3,499,063 | 3/1970 | Ninneman et al. | 414/795.3 X |
| 4,180,361 | 12/1979 | Longinotti | 414/795.3 X |
| 4,461,799 | 7/1984 | Gavrilov et al. | 428/908.8 X |
| 4,612,256 | 9/1986 | Neuhäuser et al. | 428/908.8 X |
| 4,704,251 | 11/1987 | Kraemer | 428/908.8 X |
| 4,809,881 | 3/1989 | Becker | 414/798.1 X |
| 4,906,529 | 3/1990 | Brundbjerg et al. | 428/908.8 X |
| 4,909,412 | 3/1990 | Cerf | 414/798.1 X |
| 5,033,935 | 7/1991 | Decrane | 414/798.1 |

FOREIGN PATENT DOCUMENTS

| | | |
|---|---|---|
| 2599696 | 12/1987 | France . |
| 2603021 | 8/1977 | Germany . |
| 3811310 | 10/1989 | Germany . |
| 423649 | 4/1974 | U.S.S.R. . |
| 975548 | 11/1982 | U.S.S.R. . |

*Primary Examiner*—Vinh T. Luong
*Attorney, Agent, or Firm*—Bachman & LaPointe

[57] ABSTRACT

In a detent lever for a stacking column for storing storage products, comprising a control lever (3) and a supporting arm (4) having supporting surfaces (6), which are arranged on either side of a pivot pin, a slip-on clip (11) is to be put over the supporting arm (4) or the supporting surface (6).

8 Claims, 1 Drawing Sheet

DETENT LEVER FOR A STACKING COLUMN FOR STORING STORAGE PRODUCTS

The present invention relates to a detent lever for a stacking column for storing storage products, comprising a control lever and a supporting arm having supporting surfaces, which are arranged on either side of a pivot pin.

Detent levers of this type are known, for example, from German Offenlegungsschrift 38 11 310. As a rule, they are situated in a horizontally or vertically arranged stacking column, with successive detent levers cooperating. On inserting a storage product, one detent lever is brought into a working position and the detent lever arranged above it is brought into a ready position, whereas the following detent levers are still situated in the rest position.

As a rule, a detent lever of this type is produced from aluminum, i.e. it is cut off in slices from an extruded aluminum section. Although aluminum is an inexpensive material, it nevertheless has disadvantages. In particular, aluminum is not abrasion proof. If sharp-edged storage products made of steel are laid on aluminum detent levers of this type, the supporting arms are damaged.

In addition, minor changes in the dimension of a storage product for example may lead to a particular stacking column being no longer useable, because, for example, the detent levers are too far apart from one another, even in the working position.

Another detent lever of the abovementioned type, in which a rubber buffer is situated on the supporting arm, is known from German Patent 36 19 069. Although this rubber buffer protects the storage product against damage, it does not protect the supporting arm against damage by the storage product. In addition, it too is unable to cope with different dimensions of the storage product.

The object on which the present invention is based is to develop a detent lever of the abovementioned type, in which the disadvantages mentioned do not occur and, in particular, neither the detent lever nor the storage product is damaged.

This object is achieved by putting a slip-on clip over the supporting arm or the supporting surface.

This slip-on clip should preferably consist of a different material than the detent lever made of aluminum. As a result, it is possible to continue producing the detent lever cheaply from aluminum, whereas the more expensive material is used for the slip-on clip which, however, requires less material.

In a preferred exemplary embodiment, the slip-on clip is to consist of a stainless material 4301 (spring steel). This spring steel is considerably stronger and is not damaged even with sharp-edged storage products made of steel. In addition, it is stainless, so that there is no danger of it having any disadvantageous effects on the storage product either.

Another preferred material is an electro-galvanized spring steel, which has similar properties.

In a simple exemplary embodiment, the slip-on clip consists of two legs joined to one another by a bend, one leg engaging over an upper surface of the supporting arm and the other leg engaging under a lower surface of the supporting arm. As a result, a cover protecting the supporting arm is produced.

For simplicity, formed-in grooves cooperating with corresponding catch lugs of the slip-on clip are used to fix this slip-on clip on the supporting arm or to the supporting surface. Grooves are chosen because they can be formed in an extruded section during its actual production and thus require no additional operation. Other fixing possibilities are of course also conceivable and are to be included in the present inventive concept.

To prevent a slip-on clip from being pushed off the supporting arms laterally, it is to have furthermore side pieces which engage laterally over the supporting arm or the supporting surface.

A further considerable advantage of this invention is that the slip-on clip does not have to be adapted to the shape of the supporting surface or supporting arm. Thus, for example, the slip-on clip may be constructed substantially longer so that it forms virtually an extension of the supporting surface of the detent lever. As a result, it is also possible to store storage products of a different dimension using equally spaced stacking columns. In addition, it is also possible to form lateral projections or the like on the slip-on clip depending on what kind of storage product is to be held. In this respect, a large number of variations are conceivable and are to be included in the present invention.

Figure 2:
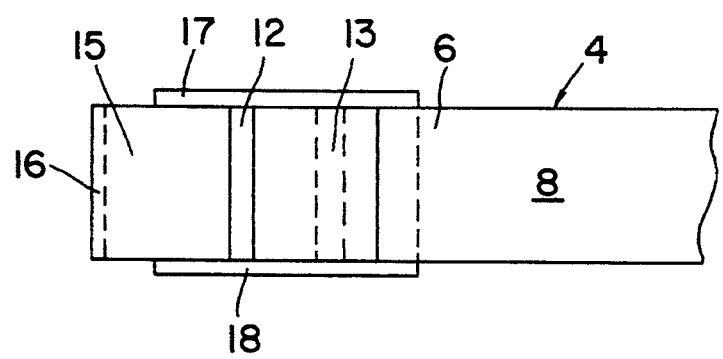

Further advantages, features and details of the invention emerge from the following description of preferred exemplary embodiments and also with reference to the drawing, in which FIG. 1 shows a cross section through a detent lever according to the invention;

FIG. 2 shows a bottom view of the detent lever, according to the invention, shown in FIG. 1.

A detent lever 1 has a hole 2 which performs as a means for pivoting the detent lever 1 by a pivot pin which is not shown in detail in the present exemplary embodiment. On one side of the hole 2 the detent lever 1 forms a control lever 3 and on the other side it forms a supporting arm 4.

The control lever 3 has a recess 5 for a weight, not shown in detail.

An essential part of the supporting arm 4 is a supporting surface 6 which, in the use position, projects approximately horizontally and forms an upper surface 7 for receiving and holding a storage product. Located opposite the upper surface 7 is a lower surface 8. Grooves 9 and 10 are formed both in the upper surface 7 and in the lower surface 8, respectively. Since the detent lever 1 is normally cut off from a corresponding aluminum extruded section, it would be most advantageous if these grooves 9 and 10 were formed in the section during the actual extrusion, corresponding protrusions thus being present in the extrusion die.

According to the invention, a slip-on clip 11 is put over this supporting surface 6. This slip-on clip 11 has catch lugs 12 and 13 which cooperate with the grooves 9 and 10, so that after slipping the slip-on clip 11 onto the supporting surface 6, this slip-on clip 11 is held.

In the present exemplary embodiment, the slip-on clip 11 consists of an upper leg 14 which has the catch lug 13, and of a lower leg 15 which has the catch lug 12. Both legs 14 and 15 are joined to one another by a bend 16. In addition, side pieces 17 and 18 (see FIG. 2) are also bent off from the upper leg 14. These side pieces 17 and 18 serve for better retention of the slip-on clip 11 on the supporting surface 6, in order to prevent this slip-on clip 11 from being pushed off the supporting surface 6 laterally. Whereas the detent lever 1 itself preferably consists of aluminum, the slip-on clip 11 is to be produced from a stainless material 4301 (spring steel). An electrogalvanized spring steel or some other desired metal is however also possible.

I claim:

1. A detent lever for a stacking column for storing storage products, which comprises: a pivoted control lever having means on said detent lever for pivoting said detent lever and a supporting arm extending from the control lever, said arm having a supporting surface, and a slip-on clip positioned over the supporting arm and engaging the supporting surface, wherein the detent lever consists of aluminum and the slip-on clip consists of stainless spring steel.

2. A detent lever for a stacking column for storing storage products, which comprises: a pivoted control lever having means on said detent lever for pivoting said detent lever and a supporting arm extending from the control lever, said arm having a supporting surface, and a slip-on clip positioned over the supporting arm and engaging the supporting surface, wherein the detent lever consists of aluminum and the slip-on clip consists of electrogalvanized spring steel.

3. A detent lever for a stacking column for storing storage products, which comprises: a pivoted control lever having means on said detent lever for pivoting said detent lever and a supporting arm extending from the control lever, said arm having a supporting surface, and a slip-on clip positioned over the supporting arm and engaging the supporting surface, wherein the slip-on clip includes two legs joined to one another by a bend, an upper leg of said clip engaging over an upper surface of the supporting arm and a lower leg of said clip engaging a lower surface of the supporting arm.

4. A detent lever according to claim 3, including at least one groove in the supporting arm cooperating with at least one catch lug in the slip-on clip.

5. A detent lever according to claim 4, wherein at least two grooves in the supporting arm cooperate with at least two catch lugs in the slip-on clip.

6. A detent lever according to claim 4, including side pieces formed laterally on at least one leg of the clip.

7. A detent lever according to claim 3, wherein said supporting arm includes a rearward portion connected to said control lever and a forward portion extending laterally from said rearward portion, wherein the clip is positioned over the forward portion.

8. A detent lever according to claim 7, wherein the forward portion has an upper surface and a lower surface, and wherein said clip is positioned over the lower and upper surfaces.

* * * * *